United States Patent [19]
Wietsma

[11] Patent Number: 5,096,641
[45] Date of Patent: Mar. 17, 1992

[54] CONTINUOUS PROCESS OF MAKING A GELLED RUBBER FOAM PRODUCT

[75] Inventor: Popke Wietsma, EM Velp, Netherlands

[73] Assignee: BASF Corporation, Parsippany, N.J.

[21] Appl. No.: 63,087

[22] Filed: Jun. 17, 1987

[30] Foreign Application Priority Data

Jul. 8, 1986 [NL] Netherlands ............. 8601779

[51] Int. Cl.$^5$ .............. B29C 35/02; B29C 39/14; B29C 67/20
[52] U.S. Cl. .................. 264/50; 264/145; 264/166; 264/233; 264/236
[58] Field of Search .......... 264/50, 145, 157, 166, 264/233, 236, 344, 347

[56] References Cited

U.S. PATENT DOCUMENTS

| | | | |
|---|---|---|---|
| 3,904,558 | 9/1975 | Graham et al. | 428/96 |
| 3,961,001 | 6/1976 | Bethe | 264/50 X |
| 4,169,172 | 9/1979 | Bethe | 264/50 X |
| 4,214,053 | 7/1980 | Porter | 521/70 |
| 4,479,840 | 10/1984 | Takegawa et al. | 156/327 |

FOREIGN PATENT DOCUMENTS

| | | |
|---|---|---|
| 591979 | 2/1960 | Canada . |
| 450920 | 7/1936 | United Kingdom . |
| 1520827 | 8/1978 | United Kingdom . |

Primary Examiner—Leo B. Tentoni
Attorney, Agent, or Firm—Karen M. Dellerman; Michael R. Chipaloski

[57] ABSTRACT

Foam rubber articles may be prepared by shaping foamed latex into the desired configuration and gelling it. The gelled latex may then be cut to the required thickness to provide articles such as cosmetic puffs. The shaping process may use a disposable mold such as a circular polymeric casting or the mold may be permanent, such as glass, passing through a gelling chamber. The process reduces waste for products which has previously been cut from slab foam.

10 Claims, No Drawings

CONTINUOUS PROCESS OF MAKING A GELLED RUBBER FOAM PRODUCT

FIELD OF THE INVENTION

The present invention relates to a process for the manufacture of foam rubber having a fixed cross sectional shape and a longitudinal axis. Such foams may be in the shape of a rod, with a circular or elliptical cross section or even an annular cross section. Such foam may then be cut into convenient lengths to form products such as cosmetic puffs. The cross section shape of the foam need not be symmetric. The foam could be in a contoured shape such as required to fit over the dash board of a car, or around small hand held devices.

BACKGROUND OF THE INVENTION

The molding of foam rubber has been known for considerable time. Non foamed articles may be made by slush molding or rotational molding. In these processes a mold is at least partly filled with an aqueous dispersion of a polymer. The mold is rotated to cover the inside surface of the mold with the dispersion. The internal mold surface corresponds to the external surface of the rubber part. Dip molding is also known. In dip molding a mold is dipped into a bath of an aqueous dispersion of a polymer. The polymeric dispersion is caused to coagulate on the mold. The resulting product may then be turned inside out, as in rubber gloves, so the external texture and detail on the mold corresponds to the external surface of the rubber part. These molding procedures have not been widely used with foamed dispersions or latices other than the manufacture of children's toys. In such processes each article is individually molded and the article is not cut.

There is considerable art pertaining to the molding of slabs or blocks of foam. Foam slabs may be made in a fixed mold such as in the Talalay process described in Canadian Patent 591,979 issued Feb. 2, 1960 to B. F. Goodrich. Generally, the process requires a high amount of cooling. The mold is expensive.

British Patent 450,920 issued Jan 22, 1935 to International Latex discloses the continuous production of long lengths of rubber. The rubber is molded in an open ended mold composed of a plurality of endless moving surfaces such as belts. Such a mold is expensive.

Gel foams are also known. These foams may be prepared by heating foamed aqueous dispersions of polymers in molds or spreading it as relatively thin sheets on substrates such as carpet backing.

In the current production of small shaped foamed articles the foam is prepared as a slab. The slab is split to the correct thickness and then cut to the required shape. This process is used to make cosmetic puffs. There is a large amount of waste in the process and it is relatively labour intensive.

Applicant has not been able to locate any description of a simple inexpensive process for producing a shaped foam rubber which may then simply be cut to the desired length. The present invention seeks to provide such a process.

SUMMARY OF THE INVENTION

Accordingly, the present invention provides a continuous process for the manufacture of a rubber foam having a fixed cross sectional shape with no part within said shape being more than about 5 cm from the perimeter of said shape, and a variable length comprising: forming a compound of an aqueous dispersion of a rubbery polymer said dispersion comprising per 100 parts by weight of polymer from about 0 to 80 parts by weight of one or more fillers, effective amounts of froth aid, gelling system, antioxidants and a cure system; frothing said compound to a density from about 800 to 80 g/l; feeding said frothed compound into one or more molds having the required cross sectional shape and a longitudinal axis and at least one opening perpendicular to said longitudinal axis, through said at least one opening; gelling and vulcanizing said frothed compound; removing said vulcanized compound from said mold; and in a convenient sequence, washing and drying said foam and cutting it to the required length.

DETAILED DESCRIPTION OF THE INVENTION

Two types of molds may be used in accordance with the present invention. An open ended mold of the required cross sectional shape may be used. If an open ended mold is used it must extend through an apparatus which will cause the foamed compound to gel as it travels through the mold. Suitable apparatus includes heating means such as a steam cabinet, a hot water bath, a dielectric heater or a microwave heater. Care must be taken not to heat the foam above the boiling temperature as this will cause the water to vaporize and may burst the mold. The mold may be metal or glass, preferably glass. The foam compound is introduced or fed into the mold under a slight pressure so that it travels through the mold and is gelled.

An alternate type of mold is a closed mold. That is, a mold closed at one end and open at the other. Such molds should have the required shape and be made from a disposable material such as poly vinyl acetate, hydrolyzed poly vinyl acetate, cellulose, and collagen. A particularly useful mold is a sausage skin. The sausage skin is filled with foam then placed in a suitable gelling means as described above.

There should be no point in the mold more than about 6 cm from the peripheral edge of the mold. This restriction is to avoid foam collapse. As the gelling is heat induced, heat must be able to penetrate the foamed compound and gel prior to foam collapse. This situation is particularly important in open molds as the core of the foam will move faster than the foam closer to the mold. If the rate of travel of the foam is too fast through the open mold it may be subject to collapse at the centre of the foam.

A suitable aqueous dispersion of polymer material comprises a latex. Suitable latices include natural rubber and SBR type latices and NBR type latices and a mixture thereof. Suitable latices may be agglomerated by suitable means such as chemical agglomeration or freeze agglomeration or pressure agglomeration. Where the foam will be exposed to an oily environment NBR latices are preferred. Suitable nitrile latices comprise polymers consisting of:

from 15 to 35 weight percent of a $C_{3-6}$ alkenyl nitrile;
from 85 to 65 weight percent of a mixture comprising 100 to 80 percent of a $C_{4-6}$ aliphatic conjugated diolefin, and from 0 to 20 percent of one or more monomers selected from the group consisting of $C_{8-12}$ vinyl aromatic monomers which may be unsubstituted or substituted by a $C_{1-4}$ alkyl radical or a chlorine or bromine atom and $C_{1-4}$ alkyl esters of acrylic and methacrylic acid.

Suitable SBR type latices comprise polymers of:
(i) from about 100 to 40 weight percent of one or more $C_{4-6}$ aliphatic conjugated diolefins which may be unsubstituted or substituted by a chlorine atom; and
(ii) up to 60 weight percent of a $C_{8-12}$ vinyl aromatic monomer which may be unsubstituted or substituted by a $C_{1-4}$ alkyl radical or a chlorine or bromine atom.

The SBR type latices may include homopolymers of conjugated diolefins which are substituted by chlorine atoms such as neoprene. The SBR latices also include the conventional styrene-butadiene polymers.

Generally, these latices may be stabilized with a fatty acid soap such as sodium palmitate or potassium oleate. For gelling processes which lower the pH of the latex such as those using alkali metal silicofluorides, or ammonium or amine salts of carboxylic acids, in the presence of a divalent metal ion, preferably zinc, the soap is converted to an insoluble material, destabilizing the latex. There are many gelling systems known to those skilled in the art. Two particularly useful acid gelling agents are sodium silicofluoride and ammonium acetate. To reduce the speed of gelation when using sodium silicofluoride as a gelling agent it is known to add small amounts, generally about 0.1 to 0.2 phr of potassium chloride. In the case of ammonium acetate the rate of gellation may be reduced by adding small amounts, from about 1 to 10 parts by weight per part of gelling agent, of a non ionic surfactant. Other gelling systems include divalent salts of amino acids used in conjunction with a salt of an inorganic acid. Such systems are disclosed in U.S. Pat. No. 4,479,840, issued Oct. 30, 1984 to Sunstar Giken Kabushiki, the disclosure of which is hereby incorporated by references. The gelling agent is generally used in small amounts usually less than about 10, preferably less than about 5 parts by weight per 100 parts by weight of polymer.

In some cases, where it is desired to make a one component system or where it is desired to broaden the tolerance of the foam to gelation it is desirable to include compounds to broaden gel tolerance. Such compounds are used in minor amounts, usually less than 10, preferably less than 3 weight percent based on the polymer. Generally these compounds are ammonium or amine salts of relatively strong inorganic acids. Suitable compounds include ammonium sulfate, ammonium sulphamate, lower ($C_{1-4}$) amine sulfates and lower ($C_{1-4}$) amine sulfamates. Useful references disclosing the use of such compounds are U.S. Pat. Nos. 3,904,558 and 4,214,053, issued Sept. 9, 1975 and July 22, 1980 respectively, in the name of Polysar Limited.

The gelling agent may be a polyether or a low molecular weight glycol. The use of these agents is known and discussed in High Polymer Latices, Vol. 1, Fundamental Principles, by D. C. Blackley, MacLaren and Sons Ltd., London, 1966, pages 43 and 44.

Silicone polyethers are also a particularly useful class of heat sensitive gelling agents. The use of these agents in conjunction with sulfonate surfactants or with ethoxylated tertiary amines is disclosed in U.S. Pat. No. 3,702,315 issued Nov. 7, 1972 to the B. F. Goodrich Co., and British Patent 1,520,827 published Aug. 9, 1978 in the name of the B. F. Goodrich Company (now assigned to Polysar Financial Services S.A.), the disclosures of which are hereby incorporated by reference.

Preferred silicone polyethers have the formula:

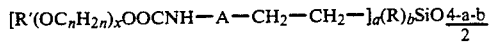

wherein
R is an organic radical bound to the silicon atom, preferably a $C_{1-4}$ alkyl radical, most preferably a methyl radical;
R' is a $C_{1-7}$ alkyl radical, preferably a butyl radical
A is a divalent hydrocarbon atom containing no more than about 7 carbon atoms,
a has a value from 0.05 to 1.00 inclusive;
b has a value from 1.12 to 2.25 inclusive and the sum of a+b is equal to from 2.02 to 2.40 inclusive;
n has a value from 2 to 4 inclusive; and
x has a value from 5 to 100.

The silicone polyethers and vinyl polyethers are used in relatively low amounts, usually less than about 1.0, preferably less than about 0.5 parts by weight per 100 parts by weight of polymer. The low molecular weight glycols are used in slightly higher amounts, generally in the range from about 1 to 3.0, preferably about 1.5 to 2.5 parts by weight per 100 parts by dry weight of polymer.

The aqueous dispersion of the polymer may be compounded in a conventional manner. The latex compound may include a dye or pigment to give a desired colour such as a flesh tone. Fillers are added to extend the foam and improve the cutting and splitting of the foam to the desired length. For good quality foam the filler level should not be more than about 80, preferably less than 50 parts by weight per 100 parts by dry weight of polymer. Preferred fillers include clay and aluminum hydrate, but other inert non abrasive fillers may be used.

The compound should contain a cure paste. There are a number of cure pastes available which typically contain a vulcanizing agent, an antioxidant, an accelerator and optionally a pigment. The use of such material is well known in the art. A typical cure paste may comprise:
2 to 3, preferably about 2.3 parts by dry weight sulfur;
3 to 5, preferably about 3 parts by dry weight zinc oxide;
0.8 to 1.2, preferably about 1.0 parts by dry weight ethyl zimbate;
about 0.5 parts of a diphenyl amine-acetone reaction product (Aminox-Trademark); and
about 0.3 parts by weight of a polymeric hindered phenol antioxidant (Wingstay L-Trademark).

The cure paste is usually used as an aqueous dispersion having a solids content from about 40 to 60 weight percent. The cure paste should be used in an amount to provide from about 5 to 10, preferably about 8 parts by dry weight of the cure paste per 100 parts by dry weight of polymer.

The compound may contain a small amount of a froth aid. This is a material which helps the compound to develop and maintain a foam structure prior to gelling. The froth aid may be a natural soap. These materials may be added to the compound in an amount less than 5, generally about 1 to 3 parts by weight per 100 parts by weight of polymer.

The compound is then frothed. There are a number of devices available for frothing dispersions. A preferred type of frothing device is a continuous automatic mixer, commonly called an Oaks Mixer. The compound may be frothed to a density from about 800 to 80, preferably 600 to 300 g/l.

The foamed compound is then fed to the molds. If the mold is an open ended mold the foam may feed directly to the mold. If the mold is a disposable closed end mold the foam is fed through a variable outlet arrangement so that when one mold is filled a new mold may be automatically shifted into place for filling.

For open ended molds the mold should extend through a suitable means for gelling the foam. A preferred gelling means is heat. The heat may be provided by a steam cabinet, a hot fluid, preferably a water bath, a hot air oven, a dielectric field or a microwave oven. For some heating means the construction of the mold must be considered. Metal molds will not be suitable with microwave or dielectric ovens, thus, glass should be used with these types of heating means. For open ended molds the foam passes through the mold and heating means. The rate of travel of the foam through the mold should be such that the foam will gel prior to exit from the mold. It must also be remembered that the foam will be subject to a certain amount of drag in areas adjacent to the mold walls. The flow rate of the foam should be such as to minimize the internal delamination within the foam. The back pressure of the Oaks foamer will have to be experimented with to obtain the correct flow rate through the mold. The water released from the foam on gelling is generally sufficient to reduce or minimize the sticking of the foam to the mold. If sticking occurs it may be desirable to spray the interior of the mold with a lubricant such as a low molecular weight glycol.

For closed molds, the issue of flow rate does not arise. The mold is filled then placed in the heating means.

After the foam has been gelled and cured it may be subjected to processing in any convenient order. In applications where the foam needs to be inert, such as cosmetic puffs it is preferably to cut, wash, and dry the foam.

The process of the present invention is applicable to foams which have a uniform cross sectional shape along a longitudinal axis. The process may be used to make circular or elipsoid shaped rods which may be cut to form cosmetic puffs. The process may be used with annular rods to produce pipe insulation. The process could also be used to produce curved foam to cover dashboards of cars or to cover small hand held appliances.

The following experiments are intended to illustrate the invention and not to limit it. In the experiments the parts are parts by weight unless otherwise specified.

EXAMPLE 1

A compound was prepared having the following composition:

| | |
|---|---|
| High solids nitrile latex 63-67% polymer | 100 parts |
| Filler (aluminum hydrate) | 50 parts |
| Gelling Agent (sodium silicofluoride) | 2.3 parts |
| Cure paste (as described above) | 8.0 parts |

The compound was foamed in a laboratory foamer to a density of 80 g/l. The foamed compound was then fed into a sausage skin having a diameter of about 5 cm (NALO-FRASER Nkal.65 sausage skin from Hoechst AG). The sausage skin was closed at each end placed in a water bath at 80° C. for 30 minutes. The gelled and cured foam "sausage" was removed from the bath and cut into sections. Several sections were washed and dried and the skin was removed to produce a foam rubber rod. The rod was cut at lengths of about 1 cm to produce a cosmetic puff having oil resistance and a soft flexible resilience.

EXAMPLE 2

The above procedure was repeated except that the foamed compound was directly fed into a 7 cm open ended glass pipe passing through a hot waste bath at 80° C. The feed rate of the foam was selected to provide a 20 minute dwell time. The foam extruded from the end of the pipe had a smooth glossy surface. The foam was washed, dried, vulcanized and cut at 1 cm lengths to produce suitable cosmetic puffs.

What is claimed is:

1. A continuous process of making a gelled rubber foam having a fixed cross-sectional circular, annular, or oval shape, with no part within said shape being more than 5 cm from the perimeter of said shape, and a variable length comprising:
   forming a compound of an aqueous dispersion of a rubbery polymer selected from the group consisting of:
   (i) co-polymers of:
     (1) from 15 to 35 weight percent of a $C_{3-6}$ alkenyl nitrile;
     (2) from 85 to 65 weight percent of a mixture comprising 100 to 80 percent of a $C_{4-6}$ aliphatic conjugated diolefin and from 20 to 0 percent of at least 1 monomer selected from the group consisting of $C_{8-12}$ vinyl aromatic monomers which may be unsubstituted or substituted by a $C_{1-4}$ alkyl radical or a chlorine or bromine atom; and $C_{1-4}$ alkyl ester of acrylic and methacrylic acid;
   (ii) copolymers of:
     (1) from 100 to 40 weight percent of at least one $C_{4-6}$ aliphatic conjugated diolefin which may be unsubstituted or substituted by a chlorine atom; and
     (2) up to 60 weight percent of a $C_{8-12}$ vinyl aromatic monomer which may be unsubstituted or substituted by a $C_{1-4}$ alkyl radical or a chlorine or bromine atom;
   (iii) natural rubber; and
   (iv) a mixture thereof comprising per 100 parts by dry weight of polymer from 0 to 80 parts by weight of at least one filler, effective amounts of froth aid, gelling system, antioxidants, and a cure system;
   frothing said compound to a density from 800 to 80 g/l; feeding said frothed compound into at least one mold having fixed, non-moving walls, the required cross-sectional shape, a longitudinal axis greater than the cross-sectional diameter of the mold, and at least one open end perpendicular to said longitudinal axis; gelling and vulcanizing said frothed compound into a foam rubber using a heating means, removing said vulcanized foam rubber from said mold; and in a convenient sequence, washing and drying said foam and cutting it to a required length.

2. A process according to claim 1 wherein said gelling system is a silicone polyether of the formula

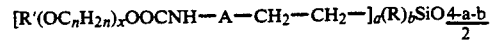

wherein
R is a $C_{1-4}$ alkyl radical bound to the silicon atom,

R' is a $C_{1-7}$ alkyl radical;

A is a divalent hydrocarbon containing no more than about 7 carbon atoms, a has a value from 0.05 to 1.00 inclusive;

b has a value from 1.12 to 2.25 inclusive and the sum of a+b is equal to from 2.02 to 2.40 inclusive;

n has a value from 2 to 4 inclusive; and x has a value from 5 to 100 and is present in an amount from about 0.5 to 1 part by weight per hundred parts by dry weight of the polymer.

3. A process according to claim 1 wherein said gelling system comprises per 100 parts by dry weight of polymer up to about 5 parts by weight of an alkali metal silicofluoride and 0 up to about 3 parts by weight of an agent selected from the group consisting of ammonium sulphamate and ammonium sulfate.

4. A process according to claim 1 wherein said gelling system comprises per 100 parts by dry weight of polymer up to about 5 parts by weight of ammonium acetate and 0 up to about 3 parts by weight of an agent selected from the group consisting of ammonium sulphamate and ammonium sulfate.

5. A process according to claim 3 wherein said mold is made of metal or glass, and is open at both ends of its longitudinal axis and has a sufficient length of its longitudinal axis extending through a heating means so that, dwell time of said frothed compound in said mold is sufficient to gel and vulcanize said frothed compound.

6. A process according to claim 3 wherein said mold comprises a disposable sheath, open at only one end of its longitudinal axis and a said mold when filled is placed in a said heating means for a period of time sufficient to gel and vulcanize said frothed compound.

7. A process according to claim 4 wherein said mold is made of metal or glass, and open at both ends of its longitudinal axis and has a sufficient length of its longitudinal axis extending through a heating means so that the dwell time of said frothed compound in said mold is sufficient to gel and vulcanize said frothed compound.

8. A process according to claim 4 wherein said mold comprises a disposable sheath, open at only one end of its longitudinal axis and said mold when filled is placed in a heating means for a period of time sufficient to gel and vulcanize said frothed compound.

9. A process according to claim 2 wherein said mold is made of metal or glass, and open at both ends of its longitudinal axis and has a sufficient length of its longitudinal axis extending through a heating means so that dwell time of said frothed compound in said mold is sufficient to gel and vulcanize said frothed compound.

10. A process according to claim 2 wherein said mold comprises a disposable sheath, open only at one end of its longitudinal axis and said mold when filled is placed in a heating means for a period of time sufficient to gel and vulcanize said frothed compound.

* * * * *